UNITED STATES PATENT OFFICE.

LUDWIG GROTE, OF LONDON, ENGLAND.

PROCESS OF MANUFACTURING MOLDABLE MASS OR ARTICLES FROM ASBESTOS.

SPECIFICATION forming part of Letters Patent No. 595,168, dated December 7, 1897.

Application filed December 18, 1896. Serial No. 616,215. (No specimens.) Patented in England December 17, 1895, No. 24,163; in Germany December 24, 1895, No. 89,542, and in France March 20, 1896, No. 252,737.

*To all whom it may concern:*

Be it known that I, LUDWIG GROTE, manager of works, a citizen of the German Empire, residing at 84$^b$, East India Dock Road, London, England, have invented certain new and useful Improvements in Processes of Manufacturing a Moldable Mass or Articles from Asbestos, (for which I have obtained a patent in Great Britain, No. 24,163, bearing date December 17, 1895; in Germany, No. 89,542, bearing date December 24, 1895, and in France, No. 252,737, bearing date March 20, 1896,) of which the following is a specification.

This invention relates to the manufacture of waterproof and fireproof plastic bodies from asbestos fiber or its products. This is attained by steeping asbestos or asbestos products first into a mixture of solutions of soluble glass, glue, and formaldehyde and afterward into the solution of a salt of alumina, baryta, or strontia, and after the material by this process having been converted into a parchment-like state it is further treated, as will be hereinafter described.

In using asbestos fiber the process and the proportions of mixture of the required chemicals are as follows: I dissolve one part of good glue in twelve parts of soft water in a hot bath until it is completely dissolved. When the solution has become cold, I mix this dissolved glue with six parts of a solution of soluble glass of 20° to 30° Baumé, equal to 1.160 to 1.260 specific gravity, and I add to this mixture from seven to nine parts of a solution of forty per cent. formaldehyde, (CH$_2$O.) After the whole has been properly mixed I bathe the asbestos fiber in this solution until it is thoroughly saturated. Thereupon it is pressed, so as to be freed from the superfluous moisture, and it is put into a solution containing twenty to thirty per cent. of a salt of alumina, baryta, or strontia which must be soluble in water, and by this process the asbestos fiber becomes similar to parchment. When the parchment-like fiber has been dried, it is pulverized minutely by an appropriate process, and this powder may be used as filling material in the manufacture of all sorts of objects—as, for instance, accumulators, receptacles, tubes, plates, &c.— which are waterproof and fireproof and which in spite of containing soluble glass after once being dried do not exudate salts.

In the ensuing pressing and shaping of the objects the above-described mixture of soluble glass, glue, and formaldehyde is further used as binding material, because it serves to form, together with the asbestos powder, a plastic mass. The mixing proportion of this binding material is in this case somewhat stronger, a solution of soluble glass of 35° Baumé, equal to 1.320 specific weight, being used and a small quantity of litharge or other metallic oxids being added in order to quicken the drying process. Finally the finished objects after having been dried in the open air are for some time exposed to a heat of an oven, whereupon they are ready for use.

In using products of asbestos—as, for instance, asbestos paper or asbestos tissue—the process is the following: The asbestos material is dipped into a solution of soluble glass of 20° to 30° Baumé, equal to 1.160 to 1.260 specific weight, until it is completely saturated, the solution having, as in the former instance, a solution of glue and formaldehyde admixed to it. Then it is taken out and left to dry, whereupon it is laid into a watery solution containing twenty to thirty per cent. of a salt of alumina, baryta, strontia, or lime, when the asbestos paper or tissue assumes a parchment-like state.

After having been left to dry once more the material is glued together with the same mixture as before, taking care to add some soluble glass at a higher degree and a little litharge or other metallic oxids. The plates, transmission-pulleys, and similar objects made by this process are afterward freed from the superfluous gluing substance by pressing them. After about twelve hours' time the complete hardening is brought about and the objects can be worked with saw and plane and on the turner's lathe.

Having fully described my invention, what I claim, and desire to secure by Letters Patent, is—

1. The process of treating asbestos fiber, which consists in steeping asbestos fiber in a mixture of solutions of water-glass, glue and formaldehyde and subsequently steeping the same in a solution of an alumina, baryta or strontia salt, whereby the asbestos fiber assumes a parchment-like state, substantially as described.

2. The process for the manufacture of a moldable mass of asbestos fiber, which consists in steeping asbestos in a bath composed of a solution of glue, soluble glass and formaldehyde in the proportions specified, thereafter compressing said asbestos to free the same from superfluous moisture, subjecting the dried fiber to a bath of a salt of alumina, then drying and pulverizing the same to the form of a powder, compressing such powder into the form desired, drying such compressed form first in the open air and then in an oven, substantially as described.

In testimony whereof I have hereunto set my hand, in presence of two subscribing witnesses, this 8th day of December, 1896.

LUDWIG GROTE.

Witnesses:
ALFRED NUTTING,
RICHARD BAYER.